United States Patent
Bauer

(10) Patent No.: US 12,369,651 B2
(45) Date of Patent: Jul. 29, 2025

(54) METHOD FOR PRODUCING GARMENTS OR BANDAGES

(71) Applicant: EBY, Inc., New York, NY (US)

(72) Inventor: Hans Bauer, Balingen (DE)

(73) Assignee: EBY, INC., New York, NY (US)

( * ) Notice: Subject to any disclaimer, the term of this patent is extended or adjusted under 35 U.S.C. 154(b) by 0 days.

(21) Appl. No.: 18/234,462

(22) Filed: Aug. 16, 2023

(65) Prior Publication Data

US 2025/0057259 A1   Feb. 20, 2025

(51) Int. Cl.
| | |
|---|---|
| *A41C 3/00* | (2006.01) |
| *B32B 5/06* | (2006.01) |
| *B32B 37/24* | (2006.01) |
| *B32B 38/00* | (2006.01) |

(52) U.S. Cl.
CPC ............ *A41C 3/0014* (2013.01); *B32B 5/073* (2021.05); *B32B 37/24* (2013.01); *B32B 38/0004* (2013.01); *B32B 2037/243* (2013.01); *B32B 2038/008* (2013.01); *B32B 2250/02* (2013.01); *B32B 2250/20* (2013.01); *B32B 2255/02* (2013.01); *B32B 2255/26* (2013.01); *B32B 2305/18* (2013.01); *B32B 2437/00* (2013.01); *B32B 2535/00* (2013.01)

(58) Field of Classification Search
CPC .......... B32B 2037/243; B32B 2038/00; B32B 2250/02; B32B 2250/20; B32B 2255/02; B32B 2255/26; B32B 2305/18; B32B 2437/00; B32B 2535/00; B32B 37/24; B32B 38/0004; B32B 5/073
See application file for complete search history.

(56) References Cited

U.S. PATENT DOCUMENTS

| | | | |
|---|---|---|---|
| 7,025,738 B2 | 4/2006 | Hall | |
| 7,060,157 B1 | 6/2006 | Bauer et al. | |
| 9,814,626 B2 | 11/2017 | Bauer | |
| 2004/0247821 A1* | 12/2004 | Zafiroglu | D06M 17/04 428/95 |
| 2016/0312389 A1* | 10/2016 | Jang | B32B 7/12 |
| 2017/0157903 A1* | 6/2017 | Huang | B32B 7/14 |
| 2025/0057259 A1* | 2/2025 | Bauer | B32B 5/073 |

FOREIGN PATENT DOCUMENTS

| | | |
|---|---|---|
| DE | 10 2011 002 182 A1 | 10/2012 |
| DE | 10 2017 119 328 A1 | 2/2019 |
| DE | 10 2021 103 737 A1 | 8/2022 |
| EP | 2 621 286 B1 | 2/2017 |

(Continued)

OTHER PUBLICATIONS

Translation of claims for EP4046511.*

(Continued)

*Primary Examiner* — Sonya M Sengupta

(74) *Attorney, Agent, or Firm* — Gottlieb, Rackman & Reisman, PC

(57) ABSTRACT

In a method for producing garments or bandages two superimposed fabric layers are interconnected by a dot-, line-, or areal elastomer connection wherein on one of the fabric layers a three dimensional upstanding shaped part is formed by a layered application of an elastomer and is connected only to the fabric layer carrying the shaped part.

10 Claims, 1 Drawing Sheet

(56) References Cited

FOREIGN PATENT DOCUMENTS

EP       3 172 977 81       1/2018
EP          4046511 A1 *   8/2022   ........... A41C 3/0014

OTHER PUBLICATIONS

Translation of description of EP4046511.*
The European Patent Office Search Report in the German language for the corresponding European Patent Office Patent Application No. 22020053.9 (8 pages); dated Jul. 19, 2022.
The German Patent Office Search Report in the German language for the corresponding German Patent Office Patent Application No. 10 2021 103 737.9 (10 pages); dated Sep. 14, 2021.

* cited by examiner

METHOD FOR PRODUCING GARMENTS OR BANDAGES

BACKGROUND OF THE INVENTION

The present invention resides in a method for producing garments or bandages wherein two superimposed fabric layers are interconnected by an elastomer connection in the form of dots, lines or areas. In addition a three dimensional upstanding shaped part is generated by a layered application of an elastomer on a fabric layer.

EP 2 621 296 B1 discloses a garment comprising two superimposed fabric layers which are interconnected by an adhesive in a certain form. As an adhesive an elastomer is used. The inner side of one of the super imposed fabric layers is provided with a flaky material.

EP 1 211 956 B2 discloses a method of producing underwear wherein an upper and a lower fabric layer are interconnected by elastomer plastic glue deposits. The edge area of the underwear is defined by the elastomer glue connection. Outside the glue connection the fabric layers are disposed loosely on top of one another.

EP 2 822 520 B1 discloses a method for producing bandages wherein an elastomer is deposited in a still uncured state in layers on an elastic fabric layer and the elastomer forms, after curing, a three-dimensional shaped part which extends over one fabric side.

EP 3 172 977 B1 discloses a method for producing garments or bandages wherein a fabric layer is provided with a compound arrangement of elastomer and reinforcement materials. The compound arrangement is produced in that an elastomer layer is deposited in a liquid or soft state on the reinforcement material and is cured after application. The elastomer layer and the reinforcement material are each applied via a nozzle.

DE 10 2017 119 328 A1 discloses a fabric support strap material for a garment such as a bra, wherein an elastomer is deposited on at least sections of at least one fabric layer of the support strap material. In each section the elastomer is deposited in a uniform dot-, line-, or areal pattern on the fabric layer, wherein the elastomer deposits differ in the sections.

It is the object of the present invention to provide a garment or a bandage with two superimposed fabric layers whereby the garment or, respectively, the bandage is highly comfortable to wear and provides for a functional adaptation of the support forces.

SUMMARY OF THE INVENTION

In accordance with invention the object is achieved by a method for producing garments or bandages comprising the steps of providing two superimposed fabric layers (2, 3), interconnecting the two fabric layers (2, 3) by a dot-, line-, or areal application of an elastomer connection (4) and in another step providing, on one fabric layer (3), by a layered application of an elastomer material, a three-dimensional elastic shaped part (5) which protrudes from the one fabric layer (3) with the three-dimensional elastic shaped part (5) being attached only to the one fabric layer (3).

The garment or, respectively bandage produced by the method according to the invention includes two superimposed fabric layers which are partially interconnected by means of an elastomer compound. The elastomer used for the interconnection may be applied in a dot-like, a line-like or an areal form for interconnecting the two fabric layers. The elastomer is preferably applied in a liquid or soft, deformable state in which the elastomer material enters the fabric layers at least partially. After curing of the elastomer material a firm interconnection between the elastomer and each fabric layer is established whereby, because of the elasticity of the elastomer material, a certain resiliency in a direction normal to the fabric layer plane and also in both directions within the fabric layer plane is provided for.

With a dot-like application of elastomer material, only individual elastomer dots are outlined whereas, with a line-like application the elastomer is applied along a straight or a curved line or a bent line. Furthermore, the elastomer may be applied over a certain area for example in a rectangular or circular shape or similar.

It may also be expedient to apply the elastomer in a predetermined pattern in order to provide for certain effects of the supportive properties of the garment or, respectively, the bandages being produced. In each case, however, the elastomer deposition for interconnecting the two fabric layers occurs only partially so that only a part of the superimposed fabric layer areas are interconnected and other parts are free of any elastomer and are only loosely disposed on one another. It may be sufficient that less than half of the superimposed fabric layers are interconnected by the elastomer.

The application of the elastomer for the interconnection of the fabric layers occurs in a single method step. In a further method step one of the fabric layers may be provided with a three-dimensional shaped part by a layered application of elastomer material which projects upwardly over the fabric layer. Because of the use of elastomer, also the three-dimensional shaped part has a high degree of elasticity. For producing the three-dimensional shaped part, the elastomer material is applied in layers wherein, during the application, the elastomer is still in a liquid or soft deformable state and, following subsequently the application, each layer is cured. After curing another layer of elastomer may be applied until the three-dimensional shaped part has reached its desired final form.

The three-dimensional shaped part adheres only to the fabric layer which carries this shaped part. Advantageously, only one of the two fabric layers is provided with one or several three-dimensional shaped parts. Upon application of the first layer of the elastomer of the three-dimensional shaped part the elastomer may penetrate into the fabric layer material, but no connection to the second, underlaying fabric layer is established. The three-dimensional shaped part is preferably disposed on the outside of a fabric layer and is therefore facing away from the additional fabric layer.

To establish the three-dimensional shaped part, advantageously several elastomer layers are deposited. Basically, however the deposition of a single elastomer layer is enough for producing the three-dimensional shaped part. It is expedient that the thickness of the three-dimensional shaped part, as seen vertically with respect to the fabric layer plane, is greater than the elastomer connection.

The three-dimensional elastic shaped part is present in addition to the elastomer connection between the two fabric layers. When wearing the garment or applying the bandage in a certain desired manner, a pressure is exerted on a certain area of the person. With this pressure which, with regard to the overall surface area of the garment or the bandage, is locally increased, for example a massaging effect or a medically supportive function can be obtained. In case of an underwear item such as a bra, with the predetermined use of three-dimensional shaped parts in the bra, a lymph flow supporting function can be generated. The garment or respectively, the bandage may therefore also serve medical purposes.

The application of the elastomer connection and the application of the three-dimensional shaped part occur in different subsequent steps and at different locations. Preferably, the steps are timely spaced whereby either the first the elastomer connection and subsequently the three-dimensional shaped part are generated or, in a reversed order, first the three-dimensional shaped part and subsequently the elastomer connection are established.

With locally spaced different steps, the elastomer connection and the three-dimensional shaped part may be produced in a timely over-lapping fashion or, respectively, at the same time.

The elastomer connection comprises at least one interconnecting elastomer in a dot-, line-, or areal form, but preferably several such elastomer connections. In the further step at least one three-dimensional elastic shaped part is generated or, preferably several such elastic shaped parts are produced. Within the step for producing the elastomer connection several such elastomer connections may be produced in a timely successive manner or at the same time. Also, within the step for producing several three-dimensional shaped parts, these shaped parts can be produced at the same time or subsequently.

It may be expedient to use the same elastomer material for the three-dimensional shaped part and for the elastomer connection. Alternatively, different elastomers may be used for the elastomer connection and the three-dimensional shaped part. As elastomer for example silicon or a thermoplastic elastomer may be taken into consideration.

In an advantageous embodiment, part or all of the elastomer connections and three-dimensional shaped parts are disposed at different positions with respect to the area of the superimposed fabric layers.

The garment or, respectively, the bandage can be produced for example in such a way that, in a certain part or section, the superimposed fabric layers are interconnected via several elastomer connections wherein one or several three-dimensional shaped parts are arranged spaced from the elastomer connections so that the elastomer connections and the three-dimensional shaped parts are distributed in the plane of the fabric layers in which the fabric layers extend. For a further section or part of the garment or the bandage, it may be expedient that elastomer connections and three-dimensional shaped parts are disposed on top of one another. Then, accordingly, a line normal to the fabric layer plane, which extends through the three-dimensional shaped part extends through an elastomer connection disposed underneath.

For a bra it may, for example, be expedient that the cup area includes elastomer connections and, locally displaced, three-dimensional shaped parts. For the edge area of the cups as well as the support straps of the bra, it may be advantageous to provide a strip-like three-dimensional shaped part extending along the whole cup edges or, respectively the support straps of the bra whereby the two fabric layers are interconnected below the strip-like shaped part.

In another advantageous embodiment, the elastomer connection and the three-dimensional shaped part are produced in different ways. It may for example be expedient to produce the elastomer connection by a screen-printing process. Alternatively, also other application techniques may be considered, for example high pressure, low pressure, Rouleaux (a low pressure process wherein the elastomer material is applied to the fabric by pressure rollers), spraying processes or application via nozzles or similar.

The elastomer of the three-dimensional shaped part is expediently applied via a nozzle. In this process, several subsequent layers of elastomer can be applied via the nozzle. However, alternative to a nozzle application, other applications techniques may be taken into consideration.

In accordance with another advantageous embodiment, the three-dimensional shaped part is produced as a composite of an elastomer and a reinforcement material. The elastomer and the reinforcement material are applied in an uncured state and harden after the application. In this procedure, first an elastomer in a soft uncured state is applied whereupon the reinforcement material, also in a soft deformable state, is applied onto the first elastomer layer. After hardening of the reinforcement material, a further elastomer layer may be applied in order to achieve a complete coverage of the reinforcement material.

Advantageously, the one or several elastomer layers for the three-dimensional shaped part as well as the reinforcement material are applied each via a nozzle. The position of the nozzle may be adjustable in all directions and, also, the amount of elastomer material and reinforcement material discharged from the respective nozzle is adjustable.

As reinforcement material an elastomer material may be used which has a higher melting point than the elastomer which is used for the three-dimensional shaped part. For example, a plastic material such as for example PLA (polylactide) or ABS (Acrylmitrol butadien-styrol-copolymerisat) may be used. The melting point of the plastic material is for example 180° or 220° C.

It may be expedient to select a reinforcement material which has a higher flexibility than resiliency. This facilitates to apply the reinforcement material in a worm-like or strip-like form into the compound arrangement with the elastomer so that, along the longitudinal extension of the worm or, respectively, the strip, the reinforcement material has only a relatively small elasticity. This makes it possible for the worm or strip to accommodate relatively high forces in the longitudinal direction while, in a direction transverse to the longitudinal direction, the worm or strip reinforcement material is relatively flexible. Accordingly, the reinforcement material is particularly suitable for use in a compound arrangement with the elastomer for a support strap, for example, of a bra and/or the edge areas of a garment or bandage. With the high flexibility transverse to the longitudinal extension, a high wear comfort is obtained.

In the compound arrangement of elastomer and reinforcement material, also the elastomer may be applied in a worm- or strip-like fashion.

In accordance with a further advantageous embodiment the elastomer is applied to one of the material layers in strips, wherein, upon hardening of the elastomer strips, the material layers or bandages are cut for producing the edge areas of the garment piece or the bandages. Also, in this embodiment, a three-dimensional shaped part is produced which extends outwardly over the edge of the fabric. For producing a hanger or support strap it may be advantageous to include in the elastomer a reinforcement material as described earlier. In the application as a support strap this also has the advantage that no additional design elements are required. The support straps simply consist of the two superimposed fabric layers which are interconnected by the elastomer compounds and the additional strip-like elastomer layer which forms the three-dimensional shaped part and extends over a fabric layer, possibly with integrated reinforcement material via which increased longitudinal forces can be transmitted.

Further advantages and suitable embodiments of the invention will become apparent from the claims and the description with reference to the accompanying drawings.

BRIEF DESCRIPTION OF THE DRAWINGS

In the figures identical components are designated by the same reference numerals.

DETAILED DESCRIPTION OF THE INVENTION

Figure 1:
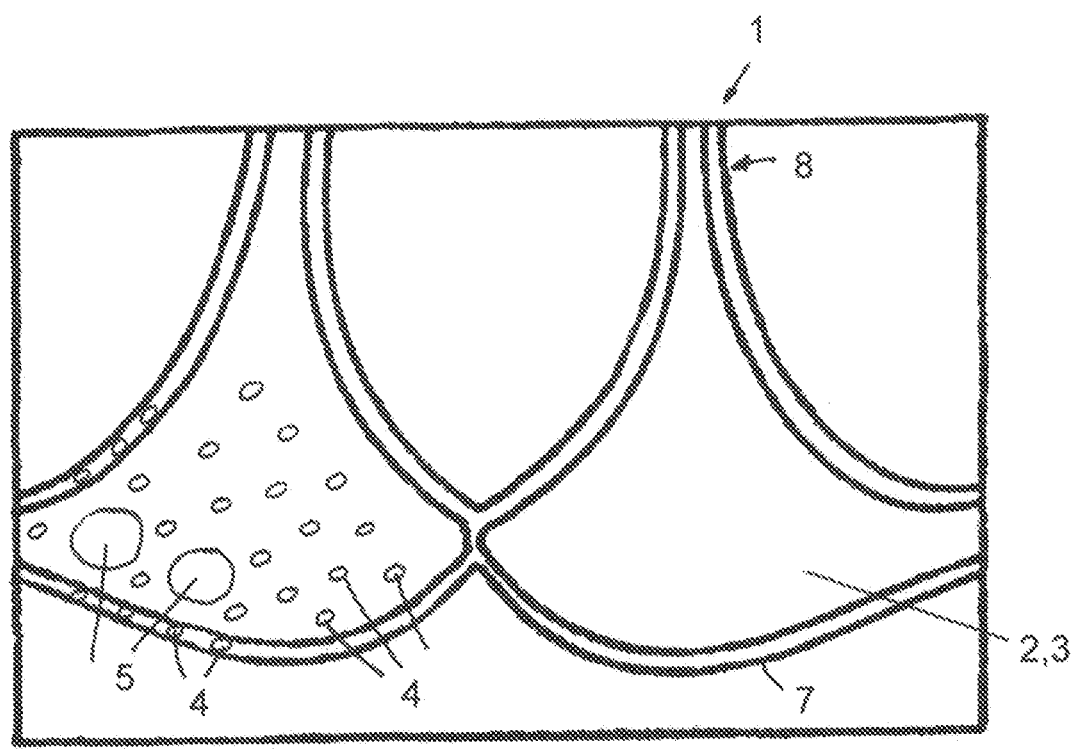
FIG. 1 shows a bra with two superimposed fabric layers which are interconnected in the cup areas via elastomer dots wherein additionally in the cup areas three-dimensional shaped parts of elastomer are provided which project above the fabric plane or surface.
Figure 2:
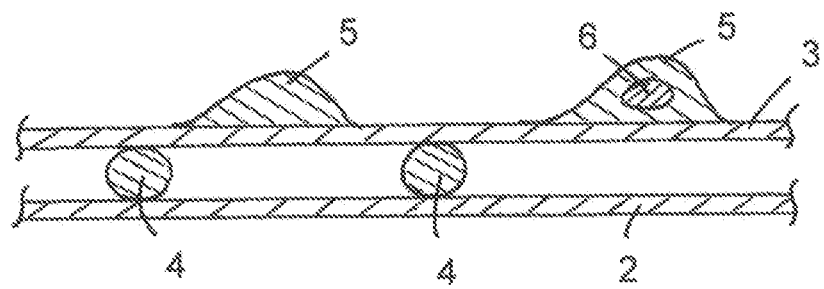
FIG. 2 shows a section of the bra in the cup area.

As apparent from FIG. 1 in connection with the sectional representation of FIG. 2, a garment 1 in the form of a bra comprises two superimposed elastic fabric layers 2, 3 which are interconnected in the cup area and in the edge areas via elastomer connections 4. In FIG. 1, in an exemplary way, only one cup area is shown with elastomer connections, but the second cup area is provided with elastomer connections in the same way as the first cup area.

The elastomer connections 4 comprise individual elastomer dots which are produced in particular in a screen printing process and applied to one of the two fabric layers 2, 3. After application of the elastomer in a soft deformable state, the second fabric layer 3 can be applied whereupon the elastomer cures. In its soft deformable state, the elastomer material penetrates each fabric layers 2, 3 so that, after curing, a firm connection between the two fabric layers is established which however permits an elastic relative movement between the fabric layers 2, 3 because of the elasticity of the elastomer material.

In the cup area of the bra 1 there is a multitude of dot-like elastomer connections which are however spaced from one another. It may be expedient to provide in different areas of the cups for different density distributions of the elastomer dots 4, in order to control the support properties of the cups. It is also possible to provide, in place of a dot-like application of elastomer material, alternatively or additionally, a line- or areal application of elastomer material for the generation of elastomer connections 4.

In the cup area there are, spaced from the elastomer connections 4, for example, two three-dimensional shaped parts 5 which also consist of an elastomer material, preferably of the same elastomer as the elastomer connections 4. As shown in the sectional representation of FIG. 2, the three-dimensional shaped parts 5 are disposed on the outside of the upper fabric layer 3 and are connected exclusively to the upper fabric layer 3. The three-dimensional shaped parts are also elastic because they are also produced from an elastomer. The three-dimensional shaped parts 5 are produced by the application of layers of elastomer on the upper fabric layers. Herein the elastomer material is deposited in layers via a nozzle in a non-cured soft and deformable state wherein advantageously the first applied layer is hardened before an additional layer of elastomer material is applied.

As shown in FIG. 2 a three-dimensional shaped part 5 is provided with a reinforcement material 6. The reinforcement material 6 forms, together with the elastomer material, the three-dimensional shaped part as a compound of two materials. The reinforcement material is preferably a plastic material which also can be applied via a nozzle, wherein the reinforcement material is applied in a soft non-cured state. After application the reinforcement material hardens. Subsequently an additional layer of elastomer material may be applied so that the reinforcement material is completely enclosed in elastomer material.

Figure 3:
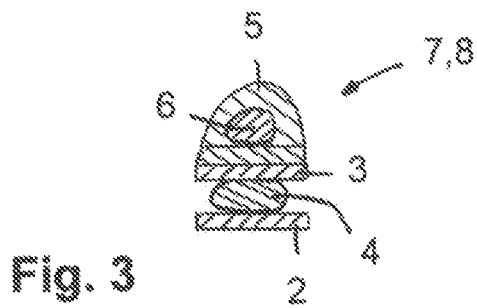
FIG. 3 shows a section through a support strap of the bra.

The rim area 7 which extends around the cup area may be provided with dot-like elastomer connections 4 arranged between the fabric layers 2, 3 for interconnecting the fabric layers 2, 3 as shown in FIG. 3 and/or may have a strip-like elastomer layer may be disposed on the upper fabric layer 3 in the form of a strip-like three-dimensional shaped part 5. The elastomer strip 5 is applied to the upper fabric layer 3 following the contour of the cup area.

After hardening of the elastomer, a cut may be made in the elastomer strip for generating the rim area 7. In this way the bra can be provided in the desired form.

Also the support strap 8 can be produced in a corresponding way. Hereby, it may be additionally advantageous if the three-dimensional shaped part 5 includes a reinforcement material 6 which extends worm-like in the longitudinal direction of the straps 8. The reinforcement material 5 has a relatively small elasticity in the longitudinal direction, but is easily bendable transverse to the longitudinal direction so that, on one hand, large longitudinal forces can be accommodated by the reinforcement material and, on the other hand, because of an adaptation transverse to the longitudinal extension, a high wearer comfort is ensured.

Also, in the edge area 7 around the cup areas, the three-dimensional shaped part 5 may be provided with a reinforcement material 6. Alternatively, however, it is possible to omit any reinforcement material in this edge area 7.

What is claimed:

1. A method for producing garments or bandages comprising the steps of providing two superimposed fabric layers, interconnecting the two fabric layers by a dot-, line-, or areal application of an elastomer connection and providing in another step, on one fabric layer, by a layered application of an elastomer material, a three-dimensional elastic shaped part which protrudes from the one fabric layer with the three-dimensional elastic shaped part being attached only to the one fabric layer.

2. The method according to claim 1, wherein at least a part of the elastomer connection and the three-dimensional elastic shaped part are provided at different positions on the superimposed fabric layers.

3. The method according to claim 2, wherein the elastomer connection and the three-dimensional elastic shaped part are produced in different ways.

4. The method according to claim 3, wherein the elastomer connection is produced by a screen printing process.

5. The method according to claim 3, wherein for generating the shaped part the elastomer material is applied via a nozzle.

6. The method according to claim 1, wherein the three-dimensional shaped part is formed as a compound of elastic material and a reinforcement material wherein the elastomer and the reinforcement material are applied in a noncured state and harden after application.

7. The method according to claim 6, wherein the flexibility of the reinforcement material is greater than its ductility.

8. The method according to claim 6, wherein the elastomer and the reinforcement material are each applied in the form of a material worm.

9. The method according to claim 1, wherein the elastomer material is applied in the form of strips and, after hardening of the elastomer material, the fabric layers are cut along the elastomer material strips for producing an edge area of the garment or bandages.

10. The method according to claim 1, wherein at least one three-dimensional shaped part has, normal to the plane of the fabric layers, a greater thickness than the elastomer connection.

\* \* \* \* \*